(12) United States Patent
Drentea

(10) Patent No.: US 7,324,797 B2
(45) Date of Patent: Jan. 29, 2008

(54) BRAGG-CELL APPLICATION TO HIGH PROBABILITY OF INTERCEPT RECEIVER

(75) Inventor: Cornell Drentea, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 267 days.

(21) Appl. No.: 11/314,688

(22) Filed: Dec. 21, 2005

(65) Prior Publication Data

US 2006/0120730 A1  Jun. 8, 2006

Related U.S. Application Data

(63) Continuation-in-part of application No. 10/459,934, filed on Jun. 12, 2003, now Pat. No. 7,139,545.

(51) Int. Cl.
*H04B 1/26* (2006.01)
(52) U.S. Cl. ............. 455/314; 455/207; 455/209; 455/315
(58) Field of Classification Search ............... 455/314, 455/207, 209, 315, 318, 326; 342/357, 357.09, 342/357.05, 357.1
See application file for complete search history.

(56) References Cited

U.S. PATENT DOCUMENTS 5,781,156 A * 7/1998 Krasner ............. 342/357.12
6,400,314 B1 * 6/2002 Krasner ............. 342/357.09

* cited by examiner

*Primary Examiner*—Tony T. Nguyen
(74) *Attorney, Agent, or Firm*—John J. Horn

(57) ABSTRACT

A unique ultra wide band receiver is provided that blends together RF and photonic technologies. The receiver has application as a steering mechanism (600) for a much higher resolution receiver. Some implementations can provide at least four times shorter scanning and processing time than current technology using Bragg-cell technology as a direct replacement for state of the art A/D technology at a high IF frequency conversion rate. The dynamic range offered through use of Bragg-cell processor technology, as used in this IF application, provides greater bandwidth than comparable A/D technology.

21 Claims, 7 Drawing Sheets

BRAGG-CELL APPLICATION TO HIGH PROBABILITY OF INTERCEPT RECEIVER

CROSS-REFERENCE TO RELATED APPLICATIONS

This application is a continuation-in-part of U.S. patent application Ser. No. 10/459,934, filed Jun. 12, 2003, now U.S. Pat. No. 7,139,545 which is hereby incorporated herein by reference in its entirety.

BACKGROUND

Many conventional wideband receivers initially down-convert received signals from a wide frequency range to a low intermediate frequency (IF). In such receivers, the initial down-conversion may result in an image frequency that is close to or within the receive-frequency range. This consequently dictates larger, bulkier and usually heavier RF front end filters which contribute to the size, space and/or weight of such receivers. Consequently, this makes these wideband receivers difficult to employ in applications with size, space and/or weight limitations. Furthermore, these receivers with such image signals may result in improper and/or false signal detection.

Thus, there are general needs for an improved wideband receiver and method. There are also needs for a wideband receiver and method that is smaller, less-bulky and/or lighter that a conventional wideband receiver. There are also needs for a wideband receiver and method that may be more suitable for applications with size, space and/or weight limitations. There are also needs for a wideband receiver and method in which the image frequency is outside the receive-frequency range. There are also needs for a wideband receiver and method that may reduce improper and/or false signal detection, especially for high-resolution wideband receivers.

BRIEF DESCRIPTION OF THE DRAWINGS

The appended claims are directed to some of the various embodiments of the present invention. However, the detailed description presents a more complete understanding of embodiments of the present invention when considered in connection with the figures, wherein like reference numbers refer to similar items throughout the figures.

Applicable reference numbers have been carried forward.

DETAILED DESCRIPTION

The present invention provides an improved wideband receiver and method. Such a receiver can be used to scan a wide frequency band, for a myriad of reasons, in an effort to detect and receive information. Typically, the scanning is accomplished in frequency steps, known as hops corresponding to tuning a local oscillator in the process of frequency conversion. In one aspect of the present invention a wideband receiver is provided that can be smaller, less-bulky and/or lighter than a conventional wideband receiver and which is more suitable for applications with size, space and/or weight limitations. In another aspect of the present invention a wideband receiver and method is provided in which the image frequency is far outside the receive-frequency range, thereby reducing improper and/or false signal detection. In still another aspect of the invention, an improved wideband receiver and method are provided wherein a Bragg Cell processor rapidly coarse tunes to an information target source followed by fine tuning.

In one embodiment of the invention, a Bragg Cell processor finds a signal band using coarse adjustments followed by fine-tuning to find a target signal. In another embodiment of the invention, an intelligent wideband RF receiver up-converts signals with a receive-frequency range to an IF frequency which may be above the highest frequency in the receive-frequency range by up to 30% to 35% or greater. This may help minimize image-frequency problems and may reduce the size, space and/or weight of the receiver considerably. In still another embodiment, the receiver includes a switchable half-octave filter bank front end and a unique synthesizer which provides fixed and stepped local oscillator (LO) signals using half-integer frequency dividers.

Figure 1:
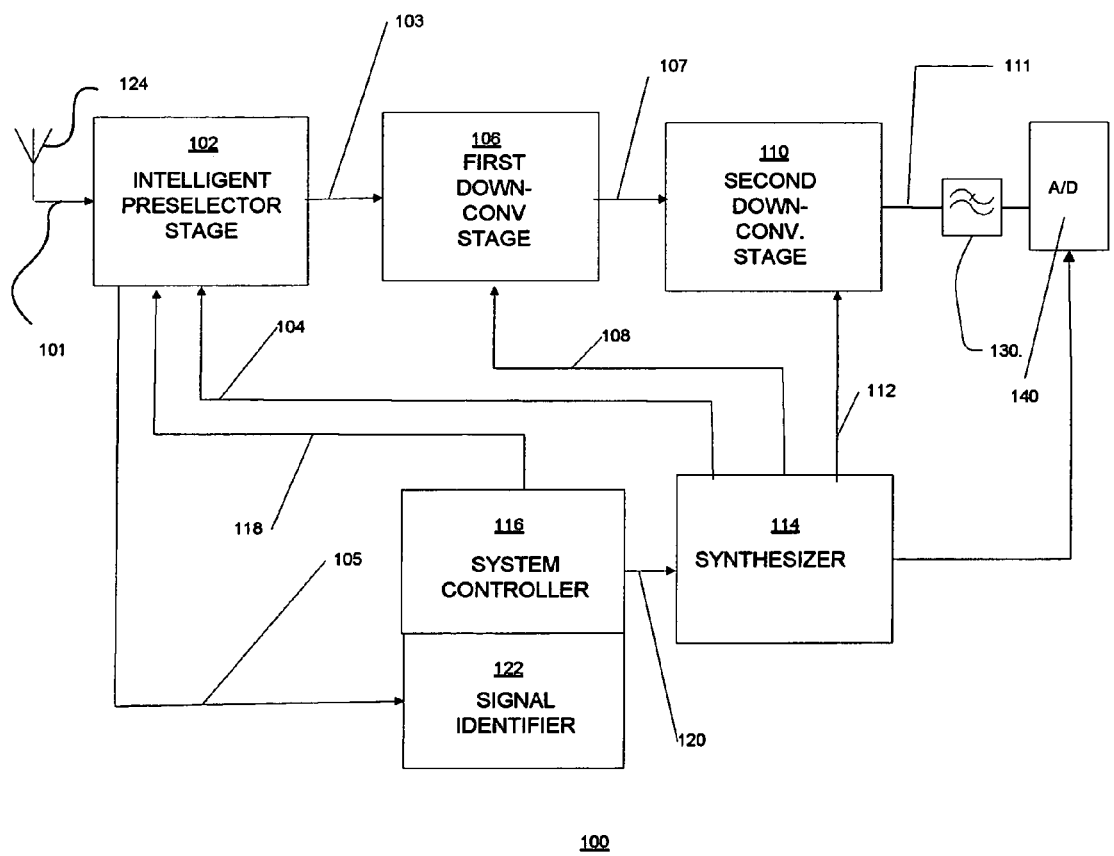
FIG. 1 is a functional block diagram of a receiver system in accordance with embodiments of the present invention.

FIG. 1 is a functional block diagram of receiver system 100 in accordance with embodiments of the present invention. Although receiver system 100 is illustrated as having several separate functional elements, one or more of the functional elements may be combined and may be implemented by combinations of software-configured elements, such as processing elements including digital signal processors (DSPs), and/or other hardware and software elements.

Receiver system 100 is contemplated as being part of a wide variety of wireless devices in the fields of radio, digital television, image processing, satellite communications, radar, etc. With reference to FIG. 1, receiver system 100 includes intelligent pre-selector stage 102 to up-convert received signals 101 to signals 103 of a first intermediate frequency (IF) using stepped first LO signals 104. Note that reference to stepped signals used herein throughout refers to signals of a given frequency incremented in frequency "steps" of a given value. First down-converting stage 106 down-converts signals 103 within the first IF frequency-range to signals 107 using fixed second LO signal 108. Second down-converting stage 110 down-converts signals 107 within the second IF frequency-range to signals 111 within a third IF frequency-range using stepped third LO signals 112. Synthesizer 114 generates the first, second and third LO signals based on a master reference signal. Intelligent pre-selector stage 102 up-converts received signals to a first IF signal having a center frequency at least approximately 30% to 35% higher than a highest frequency in the receive-frequency range. In superheterodyne receivers, image (e.g., a third order mixing product) and other products produced in the mixing process (e.g., content passed by the mixer beyond the expected sum and difference of the input signals including multiples of various sums and differences of the frequencies of the input signals) can be picked up by the receiver. A high IF (26 GHz) will generally move the image and other products out of the range of receiver reception. Otherwise, with some exceptions (see U.S. Pat. No. 4,584,716), a receiver will likely receive a desired signal and primarily its image signal, making information reception more difficult.

System controller 116 provides select command 118 to intelligent pre-selector stage 102 to select a receive frequency band used in connection with a selected first LO frequency 104 to up convert signal 101 in the receive frequency band to a signal 103 within the first IF frequency band. System controller 116 can also provide commands 120 which instruct synthesizer 114 to provide LO signals 104, 108 and 112 used to produce IF signals 103, 107 and 111 in the first, second and third IF frequency range, respectively. Controller 116 also provides first-loop step commands to synthesizer 114. In response to the first-loop step commands, synthesizer 114 may generate stepped first LO signals 104, which may be in steps of a first increment. In addition to first-loop step commands, controller 116 can provide third-loop step commands to synthesizer 114 to cause synthesizer 114 to generate stepped third LO signals 112 in steps of a second increment.

In one embodiment, receiver system 100 can include signal identifier 122 to identify one or more signals within the receive-frequency range of receiver system 100 and instruct system controller 116 to provide select commands 120 which can cause frequency conversion of signals to signals within the third IF frequency-range. In one aspect of the invention, synthesizer 114 can sweep the receive-frequency range in an effort to identify signals. Additionally, pre-selector stage 102 can provide feedback signals 105 to signal identifier 122 for further assistance in identifying signals in the receive-frequency range.

With reference still to FIG. 1, synthesizer 114 can include a master reference unit (MRU) to generate a master reference signal. Preferably, a first phase-locked loop (not shown) generates stepped first LO signals 104, a second phase-locked loop (not shown) generates a fixed second LO signal 108 and a third phase-locked loop (not shown) generates stepped third LO signals 112. The first, second and third LO signals are based on the master reference signal. In some embodiments, the first phase-locked loop may generate stepped first LO signals 104 in steps of a first increment to allow intelligent pre-selector stage 102 to up-convert signals 101 within the receive-frequency range to signals 103 within the first IF frequency-range. In these embodiments, the first IF frequency-range can have a first bandwidth of approximately equal to the PLL increment (500 MHz). In some embodiments, the second phase-locked loop may generate fixed second LO signal 108 to allow first down-converting stage 106 to down-convert signals 103 within the first IF frequency-range to signals 107 within the second IF frequency-range. In embodiments, the first and second IF frequency-ranges may have a first bandwidth. In some embodiments, the third phase-locked loop may generate stepped third LO signals 112 in steps of a second predetermined increment to allow second down-converting stage 110 to down-convert signals 107 within the second IF frequency-range to signals 111 within the third IF frequency-range. In one embodiment, signals 107 may be of a first bandwidth while signals 111 may be of a second bandwidth.

Antenna 124 may comprise a phased-array antenna, a directional or omni-directional antenna, including, for example, a dipole antenna, a monopole antenna, a loop antenna, a microstrip antenna or other type of antenna suitable for reception and/or transmission of RF signals in the receive-frequency range by receiver system 100. Further, antenna 124 in actuality may be representative of more than one antenna, given the wide reception frequency range. Therefore, antennas constructed for reception of frequencies in certain frequency bands may dictate several antennas.

In one embodiment of the invention, the receive-frequency range of receiver system 100 can span a very high range. One exemplary range is from approximately 2 to 20 GHz. In this embodiment, stepped first LO signals 104 can, for example, range from approximately 6 to 24 GHz. Further, synthesizer 114, in incremented frequency steps generated by a half-integer divider, can provide LO signals. For instance, the first LO frequency can step from 6 GHz, to 6.5 GHz, to 7.0 GHz and so forth, up to 24 GHz. In this embodiment, the first IF frequency-range may have a center frequency of approximately 26 GHz and may have a first bandwidth of approximately 0.5 GHz. Fixed second LO signal 108 can, for example, be approximately 24.5 GHz. The second IF frequency-range can have a first bandwidth with a center frequency of approximately 1.5 GHz. In these embodiments, stepped third oscillator signals 112 can, for example, range from approximately 0.75 GHz to 1.25 GHz. Synthesizer 114 can provide signals 112 in steps of approximately 10 Hz increments. In this embodiment, the third IF frequency-range may range from approximately 0.250 and 0.750 GHz and have a center frequency of approximately 0.5 GHz. This range may be stepped through twice. The third IF frequency may be provided by second down-converting stage 110 in steps of 10 Hz increments for high-resolution.

Signal 111 can be optionally input to filter 130, depending upon the application, followed by input to analog-to-digital (A/D) converter 140. The digital output of A/D converter 140 can be further processed to retrieve information contained in a receive frequency.

Figure 2:
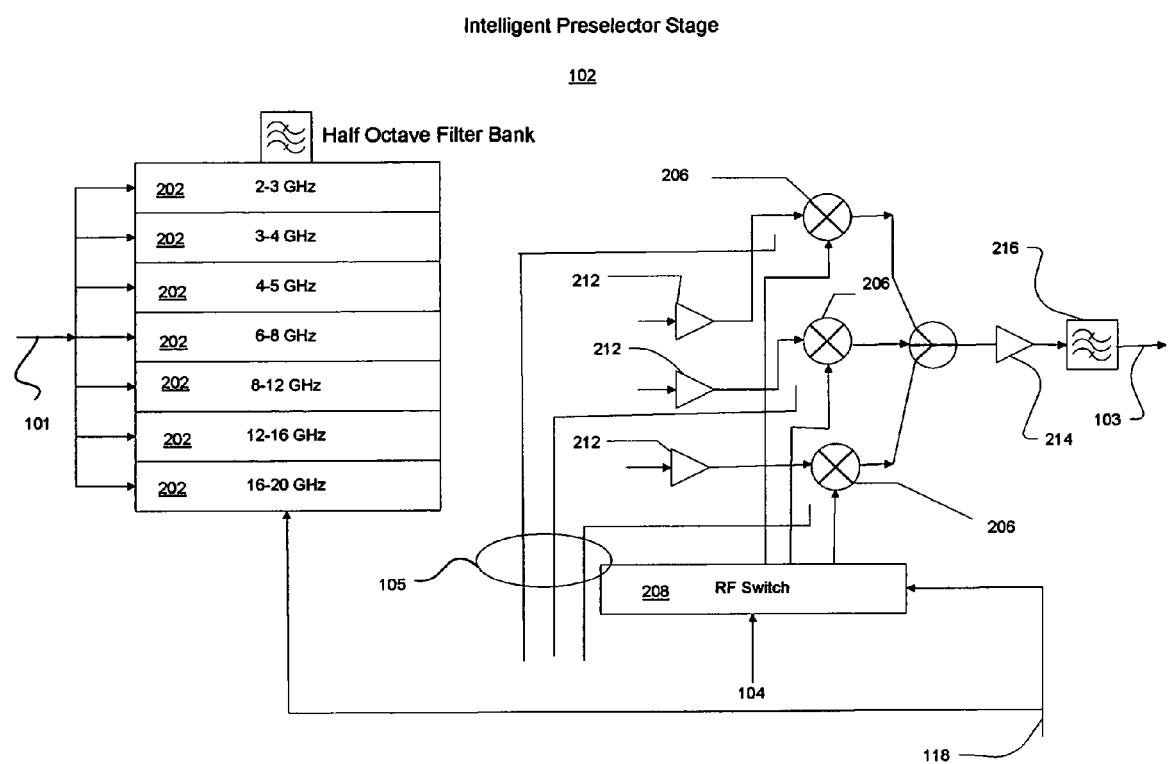
FIG. 2 is a functional block diagram of an intelligent pre-selector stage including the first up-converting IF stage in accordance with embodiments of the present invention.

FIG. 2 is a functional block diagram of one example of intelligent pre-selector stage 102 of FIG. 1 in accordance with embodiments of the present invention. Intelligent pre-selector stage 102 can up-convert received signals 101 within a receive-frequency range to signals 103 within a first IF frequency-range. In embodiments, a center frequency of the first IF frequency-range may be at least approximately 30% to 35% higher than a highest frequency in the receive-frequency range. Intelligent pre-selector stage 102 can include a plurality of half-octave filters 202 to form a filter bank. Each half-octave filter 202 can cover a half-octave portion of the receive-frequency range. By contrast, a full octave filter allows passage of a signal at a particular frequency including a signal at twice that frequency. If a signal through a full octave filter is allowed to pass through a mixer, signals at a desired frequency and products involving that frequency, particularly signals involving the image frequency can be passed to a mixer further in the signal path. The mixer will in turn produce products from those frequencies. A half octave filter only allows passage of a signal at a particular frequency including a signal at $\sqrt{2}$ times that frequency. Thus, the image frequency is not allowed to pass to a mixer in the signal path for any frequency in the range. This is significant, because without such a feature, a substantial portion (e.g., up to half) of the receiver would be devoted to filters. Therefore, a receiver that might be implemented, say in a 3 ft. by 2 ft. by 1 ft. enclosure, could be reduced by half using the half octave filters. In some embodiments, at least some of the half-octave filters, such as the upper-band filters, can, for example, comprise printed-resonant filters and at least some others of the half-octave filters, such as the lower-band filters, can, for example, comprise lumped element filters to help reduce passage of harmonic frequencies and/or products including image. Other types of filters are also contemplated.

With reference still to FIG. 2, intelligent pre-selector stage 102 may include a plurality of up-converting elements 206, e.g., mixers, to receive filtered signals in the receive-frequency range from filters 202 which together constitute a half octave filter bank. Each up-converting element 206 may up-convert a portion of the receive-frequency range in connection with stepped first LO signals 104. In embodiments, up-converting elements 206 may comprise broadband mixers. Intelligent pre-selector stage 102 can also include RF switching element 208 to switch stepped first LO signals 104 among the plurality of up-converting elements 206 in response to select command 118. Select command 118 can also select at least some of the half-octave filters. Synthesizer 114, as shown in FIG. 1, can generate stepped first LO signals 104 in steps of a first increment to allow up-converting elements 206 to up-convert signals in the receive-frequency range to signals 103 within the first IF frequency-range. In embodiments, the first IF frequency-range may have a first bandwidth approximately equal to the first increment. In embodiments, RF switching element 208 may comprise field-effect transistor (FET) switching elements, PIN-diode switching elements or micro-miniature electro-static mechanical switching (MEMS) elements. Intelligent pre-selector stage 102 can also include combining element 210 to combine and/or multiplex the outputs from up-converting elements 206. Buffers 212 are preferably used to amplify signals in the receive-frequency range for input to up-converting elements 206. Buffer 214 can be used to receive and amplify at least signals in the first IF frequency-range generated by up-converting elements 206. Filter 216 receives output signals from buffer 214 and it serves to filter out unwanted frequencies that arise primarily by virtue of operation of up-converting elements 206. Preferably, filter 216 has a bandwith of approximately the first bandwidth and it passes signals within at least the first IF frequency-range. The output of filters 202 and/or buffers 212 can be coupled to signal identifier 122 (as shown in FIG. 1) by feedback signals 105 to further the identification of signals in the receive-frequency range.

Figure 3:
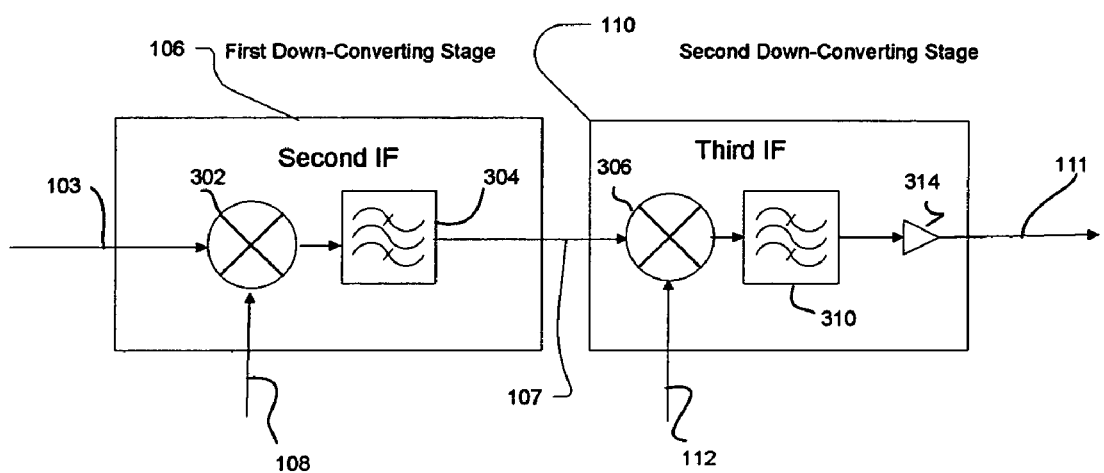
FIG. 3 is a functional block diagram of first and second down-converting IF stages in accordance with embodiments of the present invention.

FIG. 3 is a functional block diagram of first down-converting stage 106 and second down-converting stage 110 in accordance with embodiments of the present invention. First down-converting stage 106 may include second IF mixing element 302 to down-convert signals 103 within a first IF frequency-range to signals 107 within a second IF frequency-range in conjunction with fixed second LO signal 108. First and second IF frequency-ranges preferably are of a first bandwidth. First down-converting stage 106 can also include second IF filter 304 (which may have approximately the first bandwidth) to filter unwanted signals and at least pass signals 107 having a frequency within the second IF frequency-range. Second down-converting stage 110 may include third IF mixing element 306 to down-convert signals 107 within a second IF frequency-range to signals 111 within a third IF frequency-range in conjunction with stepped third LO signals 112.

Figure 4:
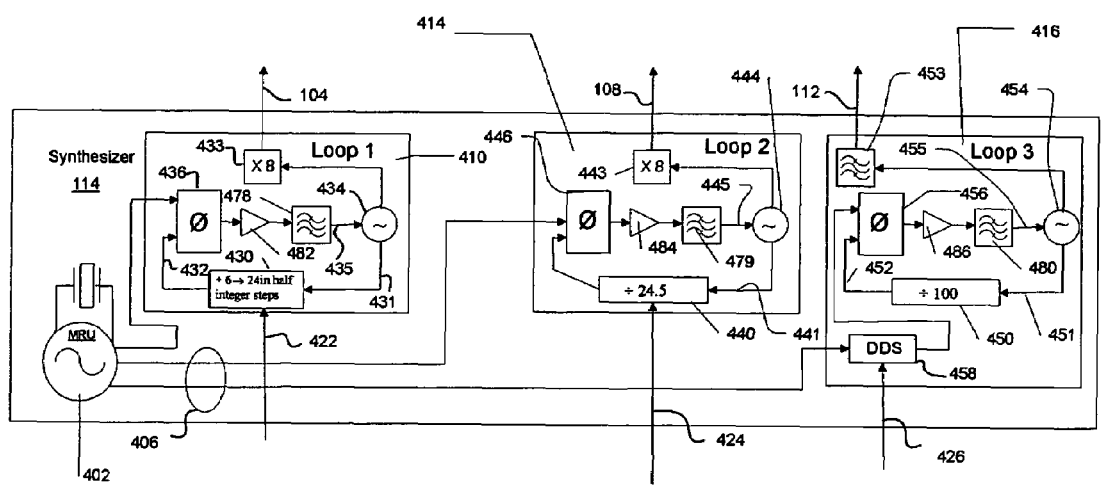
FIG. 4 is a functional block diagram of a synthesizer in accordance with embodiments of the present invention.

FIG. 4 is a functional block diagram of synthesizer 114 of FIG. 1 in accordance with embodiments of the present invention.

Synthesizer 114 performs frequency synthesis by making good use of phase lock loops. As shown, reference waves, of a particular reference frequency, are generated by master reference unit 402 and are provided to one input of a respective phase-detector circuit 436, 446 and 456. A voltage-controlled oscillator (VCO) such as VCOs 434, 444, and 454 generates a final output frequency and it provides tuning over a range of frequencies from minimum to maximum within a desired range. The output of the VCO (434, 444, 454) is fed to a load (e.g., multiplier 433, 443, or filter 453) and it is also used to drive a frequency divider (430, 440, 450) with a programmable counter which provides the function of frequency division (÷N, where N is the number of programmed steps, e.g., half-integers). The output of the divider (430, 440, 450) is a wave at the reference frequency which provides the second input to the phase-detector circuit (436, 446, 456).

Phase-detector circuits 436, 446 and 456 are logic circuits that produce dc signals whose amplitudes are proportional to the phase difference between the reference signal frequency and the divider (430, 440, 450) output frequency. These dc signals are filtered by filters 478, 479 and 480, respectively to smooth out noise and slow the response of the circuit to prevent overshoot or LOs. Filter (478, 479, 480) outputs are supplied as control inputs to VCOs 434, 444 and 454. When the phase difference between the reference signal and a respective divider output is zero, the dc output from the associated phase detector (436, 446, or 456) is just exactly that needed to tune the VCO (434, 444, 454) to a reference frequency multiplied by N. Note that buffers 482, 484 and 486, preferably follow the output of a respective phase detector 436, 446 and 456. If a phase difference exists between the inputs to the phase detectors (436, 446, 456), the bias applied to the VCO (434, 444, 454) will change in a direction to raise or lower the output frequency of the VCO sufficient to cause that phase difference to disappear. Once the VCO output achieves the value of the reference frequency multiplied by N, the VCO will "lock onto" that frequency and the feedback loop through the divider (430, 440, 450) will prevent it from drifting.

The output frequency of the VCO is adjusted to a new value by changing the number by which the divider (430, 440, 450) divides.

Synthesizer 114 generates stepped first LO signals 104, fixed second LO signal 108, and stepped third LO signals 112. Synthesizer 114 can include master reference unit (MRU) 402 to generate master reference signal 406.

Within synthesizer 114, first phase-locked loop (PLL) 410 generates stepped first LO signals 104 based on master reference signal 406 and first-loop step commands 422. Second phase-locked loop 414 generates a fixed second LO signal 108 based on master reference signal 406 and second-loop commands 424. Third phase-locked loop 416 generates stepped third LO signals 112 based on master reference signal 406 and third-loop step commands 426. First-loop step commands 422, second loop commands 424 and third-loop step commands 426 can be provided by system controller 116 (shown in FIG. 1).

First phase-locked loop 410 can generate stepped first LO signals 104 in steps of a first increment to allow intelligent pre-selector stage 102 (shown in FIG. 1) to up-convert signals within a receive-frequency range to signals within a first IF frequency-range. In this embodiment, the first IF frequency-range may have a first bandwidth of approximately the first increment.

First phase-locked loop 410 may include first-loop frequency divider 430 to divide first-loop VCO LO frequency 431 by a value to generate first-loop feedback signal 432. The value may be in half-integer increments, and in one embodiment, may be between 6 and 24 inclusive in half integer increments. First phase-locked loop 410 can also include first-loop frequency multiplier 433 to multiply first-loop VCO LO frequency 431 by a predetermined integer value to generate stepped first LO signals 104. First phase-locked loop 410 can also include first-loop VCO 434 to generate first-loop VCO LO frequency 431 in response to first-loop VCO control signal 435. First phase-locked loop 410 includes first-loop phase detector 436 to compare master reference signal 406 with first-loop feedback signal 432 to generate first-loop VCO control signal 435. In one embodiment of the invention, the number of counter steps in frequency divider 430 in half-integer increments may be responsive to first-loop step commands 422.

Second phase-locked loop 414 generates fixed second LO signal 108 to allow a first down-converting stage to down-convert signals within a first IF frequency-range to signals within a second IF frequency-range. Second phase-locked loop 414 may include second-loop frequency divider 440 to divide second-loop VCO LO frequency 441 by an integer-and-a-half value to generate second-loop feedback signal 442. Second phase-locked loop 414 can also include second-loop frequency multiplier 443 to multiply second-loop VCO LO frequency 441 by a predetermined integer value (e.g., 8) to generate fixed second LO signal 108. Second phase-locked loop 414 includes second-loop VCO 444 to generate second-loop VCO LO frequency 441 in response to second-loop VCO control signal 445. Second-loop phase detector 446 compares master reference signal 406 with second-loop feedback signal 442 to generate second-loop VCO control signal 445. Second-loop commands 424 may instruct second-loop frequency divider 440 to divide by a predetermined integer-and-a-half value (see U.S. Pat. Nos. 4,975,931 and 5,307,071).

Third phase-locked loop 416 generates stepped third LO signals 112 in steps of a second predetermined increment (e.g., 10 Hz) to allow a second down-converting stage to down-convert signals within a second IF frequency-range to signals within a third IF frequency-range. Third phase-locked loop 416 may include third-loop frequency divider 450 to divide stepped third LO signals 451 by a predetermined integer value (e.g., 100) to generate third-loop feedback signal 452. Third phase-locked loop 416 may also include programmable divider element 458 to divide master reference signal 406 in response to third-loop step commands 426 to generate stepped reference signal 459. Stepped reference signal 459 allows third phase-locked loop 416 to generate stepped third LO signals 112.

In embodiments, divider element 458 may be a direct digital synthesis (DDS) element and loop 416 may operate as a DDS-driven PLL. In this embodiment, element 458 may generate frequencies in fractional-hertz steps. In one example embodiment, element 458 may generate frequencies from 7.5 MHz to 12.5 MHz in 0.1 Hz steps.

Third phase-locked loop 416 can include third-loop VCO 454 to generate stepped third LO signals 451 in response to third-loop VCO control signal 455. Third-loop phase detector 456 compares stepped reference signal 459 with third-loop feedback signal 452 to generate third-loop VCO control signal 455. Output filtering element 453 filters stepped third LO signals 112 to help remove spurious out-of-band signals.

Some examples of half-integer frequency dividers and divider elements suitable for use as frequency dividers 430 and 440 and divider element 450 may be found in U.S. Pat. Nos. 4,975,931 and 5,307,071. Other frequency dividers and divider elements may also be suitable for use as frequency dividers 430 and 440 and divider element 450.

With reference to FIGS. 1 through 4, according to one exemplary embodiment of the invention, in connection with scanning a frequency band, a specified filter 202 from the half octave filter bank is chosen in order to obtain information in a given frequency band. Further, in connection with system controller 116 and RF switch 208, a particular local oscillator signal is generated by Loop 1 PLL 410. MRU 402 generates a 125 MHz reference signal to phase detector 436. Phase detector 436 compares the phase of the reference signal with the phase of the output signal from frequency divider 430. The divider value of frequency divider 430 steps from N=6 to N=24 in half integer (0.5) steps. Consequently, PLL 410 locks at N*125 MHz. This filtered value ranges from 0.750 GHz to 3.00 GHz and a signal of corresponding frequency is output from VCO 434 to times 8 frequency multiplier 433 as well as frequency divider 430. Times 8 frequency multiplier multiplies VCO 443 frequency output by 8 and sends this signal to an appropriate mixer 206 as a first LO signal 104 in connection with proper routing as determined by controller 116 and RF switch 208. Loop 1 therefore generates the appropriate first LO signal to cause intelligent pre-selector stage 102 to generate a 26 GHz first IF signal. For example, if a receive signal frequency at 20 GHz is selected, first LO signal 104 having a frequency of 6 MHz is input to the appropriate up-converting element 206 to result in a 26 GHz first IF signal of a 0.5 GHz bandwidth.

With reference to the same exemplary embodiment discussed above, loop 2 PLL 414 functions to provide a 24.5 GHz fixed signal to 302 in the first down converting stage 106. With a 125 MHz reference signal and a divider value of N=24.5 for frequency divider 440, VCO 444 outputs a signal of frequency 3.0625 GHz. First down-converting stage 106 produces a 1.5 GHz second IF frequency signal with a 0.5 GHz bandwidth.

With reference still to the same exemplary embodiment, second down-converting stage 110 generates a third IF signal of 0.5 GHz having a bandwidth of 125 MHz from PLL 416. DDS 458 generates signals with frequencies from 7.5 to 12.5 MHz in 0.1 HZ steps. Signals having this frequency range are input to phase detector 452. Frequency divider 450 has a fixed divider value of 100 and the input to divider 450 and filtered input to mixer 306 from VCO 454 ranges from 0.75 to 1.25 GHz in 10 Hz steps. Great selectivity is provided by the 10 Hz stepped output of VCO 454 in conjunction with the stepped reference frequency input in even smaller steps of 0.1 Hz.

Signals 111 in the third IF range can be sent to analog to digital (A/D) processors (not shown) in one and preferably more than one receivers (given the wide frequency range of the receive frequency bandwidth). The A/D converters will provide a digital output of the intelligence detected.

Figure 5:
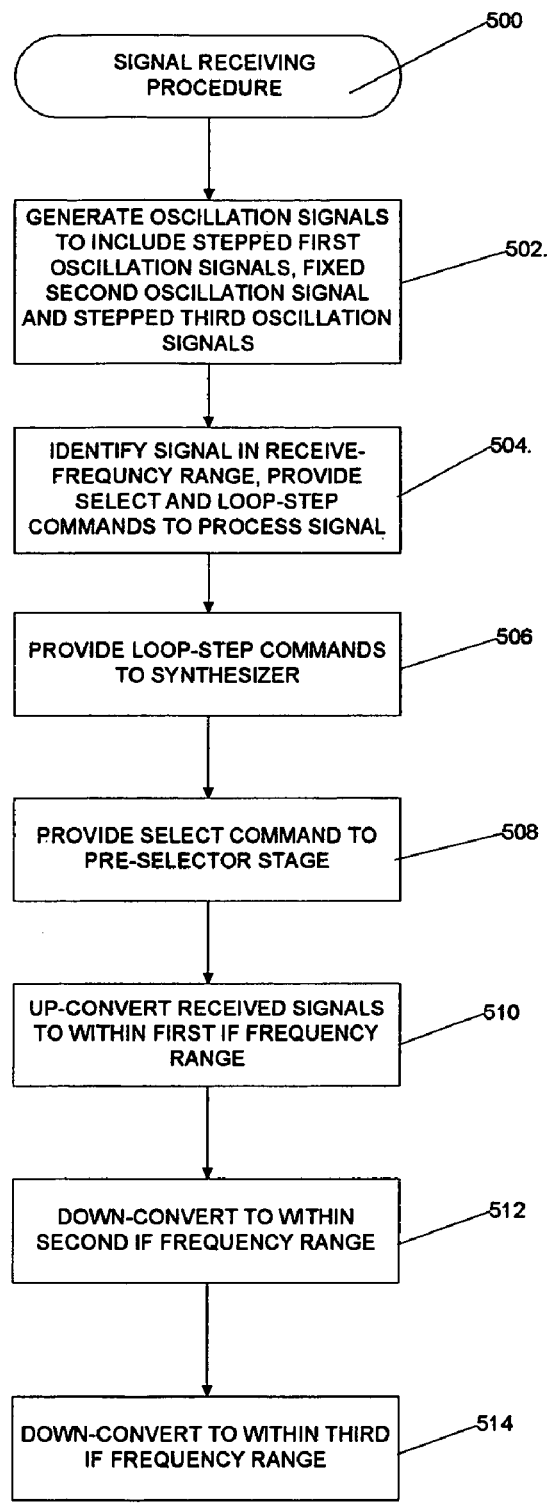
FIG. 5 is a flow chart of a signal receiving procedure in accordance with embodiments of the present invention.

FIG. 5 is a flow chart of a signal receiving procedure in accordance with embodiments of the present invention. Signal receiving procedure 500 may be performed by a receiver system, such as receiver system 100 (FIG. 1) although other receivers may also be suitable for performing procedure 500. In high-resolution wideband embodiments, procedure 500 may be suitable for receiving signals within a receive-frequency range of 2 to 20 GHz and greater with up to a 10 Hz resolution.

In operation 502, a plurality of LO signals may be generated from a master reference signal. The LO signals may include stepped first LO signals, a fixed second LO signal, and third stepped LO signals.

In operation 504, a signal within the receive-frequency range is identified, and a system controller is instructed to provide a select command to provide the first-loop step commands and to provide the third loop step commands.

In operation 506, first-loop step commands may be provided for use in generating the stepped first LO signals in operation 502 in steps of a first increment. Operation 506 may also include providing third-loop step commands to generate the stepped third LO signals in operation 502 in steps of a second increment.

In operation 508, a select command is provided to select among a plurality of up-converting elements based on a frequency of the stepped first LO signals. Operation 508 can be performed in conjunction with operation 510 to select a range of frequencies to up convert. Operations 506 and 508 can allow the identified signal to be converted to the third IF frequency-range for further processing and/or analysis.

In operation 510, received signals are up-converted to signals within a first IF frequency-range with the stepped first LO signals generated in operation 502. A center frequency of the first IF frequency-range may be at least approximately 30% to 35% higher than a highest frequency in a receive-frequency range for up-converting.

In operation 512, the signals within the first IF frequency-range are down-converted to signals within a second IF frequency-range with the fixed second LO signal generated in operation 502. In operation 514, the signals within the second IF frequency-range are down-converted to signals within a third IF frequency-range with stepped third LO signals generated in operation 502.

In embodiments, operation 502 can include generating the stepped first LO signals in steps of a first increment to up-convert signals in the receive-frequency range to the first IF frequency-range. The first IF frequency-range may have a first bandwidth of approximately the first increment. Operation 502 may also include dividing a first-loop VCO LO frequency by a value to generate a first-loop feedback signal. The value may be in half-integer increments. In an alternative embodiment, the first-loop VCO LO frequency can be multiplied by a predetermined integer value to generate the stepped first LO signals. Additionally, operation 502 can also include generating the fixed second LO signal to down-convert signals within the first IF frequency-range to signals within the second IF frequency-range. Dividing a second-loop VCO LO frequency by an integer-and-a-half value generates a second-loop feedback signal. The fixed second LO signal can be obtained in connection with multiplying the second-loop VCO LO frequency by a predetermined integer value. Within operation 502, stepped third LO signals can be generated in steps of a second predetermined increment to down-convert signals within the second IF frequency-range to signals within the third IF frequency-range. The stepped third LO signals can be divided by a predetermined integer value to generate a third-loop feedback signal. The frequency of the master reference signal can be divided in response to third-loop step commands to generate a stepped reference signal. This stepped reference signal may be used in generating the stepped third LO signals.

Figure 6:
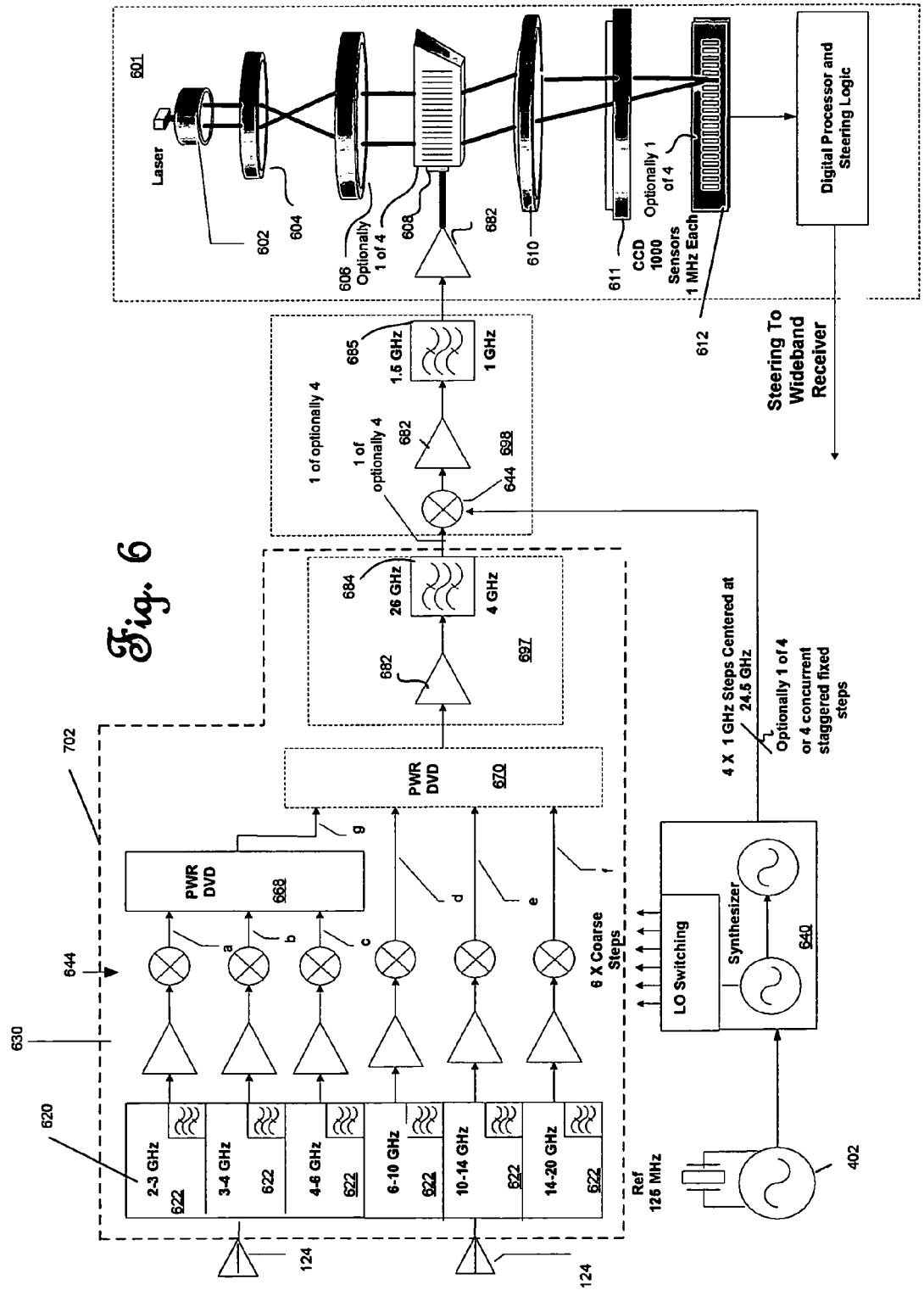
FIG. 6 is a functional block diagram of a Bragg-Cell processor in accordance with embodiments of the present invention.

The ability to scan a wide band frequency range can be greatly improved in minimizing scan time by using the Bragg-cell processor/receiver shown in the block diagram of FIG. 6. Current scans of wide-band frequency ranges are limited by conventional A/D technology's inability to capture RF data over a greater bandwidth than a 250 MHz per receiver frequency hop. Consequently, using current A/D technology results in, for instance 72 consecutive frequency hops to process a desired spectrum of 2 to 20 GHz. This results in a slow aggregate scan time. A much higher bandwidth A/D processor would be required to improve the aggregate bandwidth processing and information capture time. With a higher bandwidth per each frequency hop during the scan, faster switch speeds can be realized, optimizing receiver scanning time, performance and cost.

As indicated above, the sampling rate of A/D converter 140 in FIG. 1 is equal to the third IF frequency. A faster rate of conversion is preferred. However, current pass band A/D technology is limited in bandwidth processing. Better performance can be obtained using a specific implementation of a Bragg-cell Fourier transformer, used in the second intermediate frequency (IF) of an ultra-wide band receiver. By performing A/D conversion with a Brag-cell processor/receiver, a high rate of A/D conversion can be achieved at the rate of the second IF frequency. Conventional A/D converters can not achieve A/D conversion over a bandwidth greater than 250 MHz. By contrast, the range of frequencies input to Bragg-cell processor 601 from filter 685 span a bandwidth of 1 GHz. Because of this improvement, a Bragg-cell processor/receiver can replace current state-of-the-art low bandwidth IF—A/D technology. A Bragg-cell receiver/processor as shown in FIG. 6 has increased bandwidth processing capabilities and can obtain, as compared with conventional technology, much faster frequency coverage over the ultra-wide frequency range of 2 to 20 GHz. At a minimum, such receiver can serve as a coarse steering mechanism for a finer resolution receiver discussed above with respect to FIGS. 1-5.

An improvement, as embodied in the processor/receiver shown in FIG. 6, of at least 4 times shorter scanning and processing time than achievable with current A/D technology is feasible using a specific implementation of Bragg-cell—acousto-optical (AO) technology, providing near 100% probability of intercepting a target (e.g. content at a particular frequency, intelligence transmitted on a spread spectrum, etc.) and maintaining a similar instantaneous dynamic range performance as the current A/D state-of-the-art technology for the same IF frequency (an equivalent 8 to 10 bits in this case). The dynamic range of an A/D system is the ratio of the lowest signal to the highest signal that that system can handle. In other words for an A/D converter, dynamic range is the range of inputs over which an A/D converter will provide a valid output. Dynamic range is usually measured in decibels or dB. For more bandwidth, the Bragg cell processor provides equal dynamic range and instant Fourier transformation (FFT).

The specific Bragg-cell IF processor/receiver of FIG. 6 is able to capture at least 1 GHz per received frequency hop, thus enabling frequency acquisition over the ultra-wide band frequency range of interest at least 4 times faster than the current A/D technology. In addition, the realization of this processor can greatly simplify the receiver's synthesizer design and cost, providing a considerable reduction in the number of hops (a factor of at least 4), thus allowing for simplified brute force synthesis approaches to be used.

With reference to FIG. 6, the Brag-cell processor/receiver comprises acousto-optic steering mechanism (AOSA) 600. If implemented at a high IF, it can provide a 1 MHz frequency resolution. This relatively narrow band resolution, combined with the above described wide band scanning capability of the wideband receiver described in FIGS. 1-5, can increase the probability of intercept (POI) to nearly 100% over a 2 to 20 GHz frequency coverage. This makes the use of a specific AOSA implementation very desirable. In its simplest form, acousto-optic spectrum analyzer (AOSA) 601 includes four components: laser diode light source 602, acousto-optic Bragg-cell 608, a photo detector array preferably comprising charge coupled detector (CCD) array 612, and an associated collection of Fourier transformation optics, e.g., polarizer 604, aperture lens 606, polarizer 610 and aperture lens 611. The diagram shown in FIG. 6 and generally denoted by reference numeral 600 can serve as an RF spectrum steering mechanism for selected coarse tuning adjustments for the receiver shown in FIGS. 1-5. Each of the optical components of AOSA 601 can be optimized consistent with the performance of all other components. The complex wideband RF signal to be analyzed is input to acousto-optic Bragg-cell 608. Bragg-cell 608 includes a transparent crystal (usually Lithium Niobate or Gallium Phosphide) with a piezoelectric transducer bonded to one end. RF signals input to an electrode on the transducer are converted to sound waves which propagate through the crystal. Coherent light from a laser source interacts with the sound waves and is partially diffracted at an angle proportional to the frequency of the original RF signal (the acousto-optic effect). The spatial location of the diffracted light, when brought to focus by a Fourier transform lens, is then proportional to the frequency of the original RF signal. Different frequencies present in the Bragg-cell will be displayed simultaneously as multiple diffracted light beams. M discrete light beams can be resolved at the back focal plane of the transform lens, where M is the product of the time aperture T and the bandwidth B and of the Bragg-cell—the time-bandwidth product of the cell. The combination of the acousto-optic effect in the Bragg-cell and the Fourier transform lens thus acts like a relatively narrow band filter bank spectrometer (much like a crystal video receiver) with the output from each contiguous narrow band signal encoded on a light beam containing the signal's modulation information. Consequently, the signal resolution is much better than that given by a crystal video receiver using wide band filters.

With reference still to FIG. 6, the coarse steering provided by acousto-optic steering mechanism 600 can be implemented by simplified pre-selector 702 as compared with pre-selector stage 102 of FIG. 1 which can also be substituted therefore. Filter bank 620 includes filters 622 of a particular frequency bandwidth. In connection with logic switching, local oscillator 640 outputs an appropriate local oscillator signal to the appropriate up converting element 644 pursuant to up-converting a receive frequency signal to a first intermediate frequency, i.e., a range of frequencies centered about 26 GHz. Three (signals a, b, and c) to one (signal g) power combiner 668 and optional four (signals d, e, f, g) to one power combiner 670 offer a simplified way of multiplexing appropriate signals in connection with command and control logic (not shown) selecting the appropriate filter and local oscillator frequency from synthesizer 640. Four output signals (signals d, e, f and g) are multiplexed to filter stage 697 comprising buffer 682 and filter 684. Filter 684 has a 4 GHz bandwidth centered about 26 GHz. For implementation of a parallel processing embodiment 4, stages 698 are used, each comprising mixer 644, buffer 682, and filter 685. One of four LO outputs from synthesizer 640 is also implemented with this embodiment.

Synthesizer 640 also provides either a single signal line able to carry four consecutive scanning LO signals spaced 1 GHz apart over a band centered at 24.5 GHz or for a parallel processing case, four concurrent LO signals staggered at 1 GHz centered over the same frequency range. In one embodiment, in connection with down-conversion, the output of stage 697 is input to mixer 644 of an associated stage 698 along with the appropriate LO signal from synthesizer 640. For the parallel processing case, there will be four stages 698. Tuning is improved by a factor of four, making the probability of intercept even better. In stage 698, the output of mixer 644 is sent to buffer 682 and filtered by filter 685, resulting in a second IF frequency signal having a 1 GHz bandwidth centered about 1.5 GHz. In a parallel processing embodiment, each stage 698 provides input to an associated Bragg-cell 608. Consequently, four Bragg-cells 608, preferably mounted on a single substrate, receive input from the output of an associated stage 698. Otherwise, a single stage 698 sends input to a single Bragg-cell 608.

Scanning for content over the full range of receive frequency signals can be obtained through selection (analogous to steps on a dial) of one of six local oscillator signals to up convert an associated receive frequency signal together with stepped selection of 4 output signals to select the appropriate local oscillator signal to down-convert the first intermediate frequency signal. Six by four different tuning steps can be used to coarse tune over the entire receive frequency band.

Within Bragg-cell 608, the second IF signal is amplified and applied to a piezoelectric transducer (not shown) which is connected to a crystal (not shown). The acoustic waves in the crystal are generated by the second wave IF. Coherent light from a laser source 602 interacts with the sound waves and is partially diffracted at an angle proportional to the frequency of the original RF signal (the acousto-optic or Bragg effect). The spatial location of the diffracted light, when brought to focus by a Fourier transform aperture lens 611, is then proportional to the frequency of the original RF signal. Different frequencies present in the Bragg-cell will be displayed simultaneously as multiple diffracted light beams. The combination of the acousto-optic effect in the Bragg-cell and the Fourier transform lens thus acts like a relatively narrow band filter bank spectrometer (much like a crystal video receiver) with the output from each contiguous narrow band signal encoded by CCD array 612 on a light beam containing the signal's modulation information. For the parallel processing embodiments, four CCD arrays 612 are used. Consequently, the signal resolution is much better than that given by a crystal video receiver using wide band filters. The Bragg Cell output is sent to an intelligent command and control (not shown) where it is used to select the filter bank in an Intelligent Pre-selector subsystem associated with a receiver embodiment as shown in FIGS. 1-5. The Bragg-cell processor not only allows recovery of information quickly but it also gives an indication of where that information is located in the frequency band. The parallel processing embodiments allow an even faster scan of frequencies.

Figure 7:
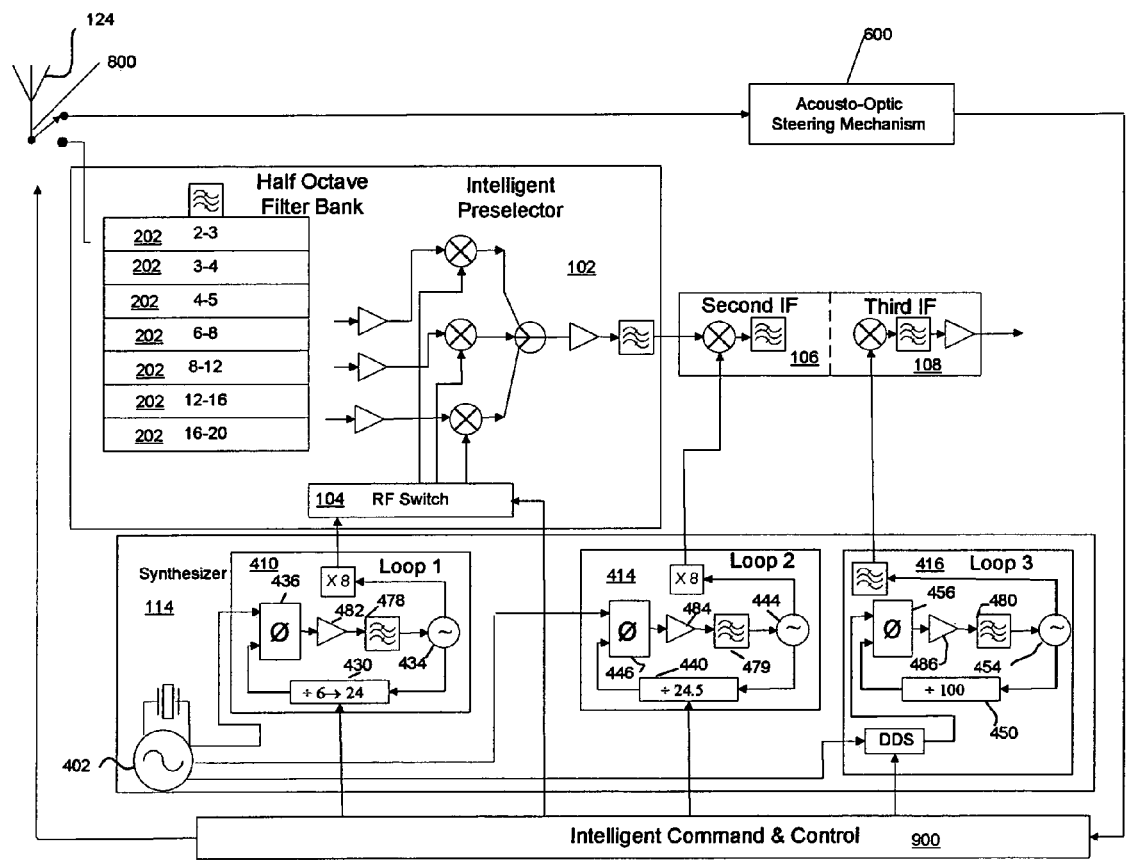
FIG. 7 illustrates a functional block diagram of the Bragg-cell wide-band processor/receiver steering mechanism in an embodiment using it for coarse frequency steering to direct a much finer resolution of frequency tuning of the ultra-wideband fully synthesized high-resolution receiver.

FIG. 7 shows a block diagram of the Bragg-cell processor/receiver providing coarse steering for the ultra-wideband receiver of FIGS. 1-4. Intelligent command and control circuitry 802 tracks the location of information found within the hops identified by steering mechanism 600. In connection with switch 800, RF signals are provided to steering mechanism 600 followed by application of settings from mechanism 600 to intelligent command and control circuitry 802 which allows a coarse setting of oscillator settings for synthesizer 114 to speed up the fine tuning provided by the wideband receiver. With switch 800 connecting antenna 124 to steering mechanism 600, a fast scanning search is conducted by steering mechanism 600. Mechanism 600 informs intelligent command and control 900 where interesting RF information is found in the frequency spectrum (e.g. 2 to 20 GHz) and immediately directs intelligent command and control 900 to a) switch antenna 124 with switch 800 to the intelligent pre-selector shown in FIGS. 1-4, and b) redirect Loop 1, loop 2 and loop 3, (elements 410, 414 and 416) to the exact active frequencies for further analysis (fine tuning).

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A receiver comprising:
   a plurality of half octave filters;
   at least one frequency up-converter operable to receive input RF signals from ones of said plurality of filters to produce first IF signals;
   at least one frequency down-converter operable to receive input from said first IF signals to produce second IF signals; and
   a processor operable to provide analog-to-digital conversion of said second IF signals using acousto-optics, said processor including a laser source and a plurality of lens.

2. A receiver as recited in claim 1 wherein said first IF signals are higher in frequency than said RF signals by about 30 to 35%.

3. A receiver as recited in claim 1 wherein said processor has a bandwidth of greater than 250 MHz.

4. A receiver as recited in claim 2 wherein said first IF signals are between about 24 GHz and about 28 GHz.

5. A receiver as recited in claim 2 wherein said RF signals range in frequency from about 2 GHz to about 20 GHz.

6. A receiver as recited in claim 1 wherein said processor is a Bragg-cell processor.

7. A receiver as recited in claim 6 wherein said Bragg-cell processor comprises a laser, an acousto-optic Bragg-cell, a photo detector, and Fourier transformation optics, said processor being operable to convert an RF signal into a sound wave which interacts with coherent light from said laser to produce partially diffracted light through said Fourier transformation optics at an angle proportional to the frequency of the RF signal.

8. A receiver as recited in claim 7 wherein said photo detector comprises a charge coupled detector.

9. A method of scanning a range of frequencies for information comprising:
   filtering a band of RF frequencies;
   up-converting said RF frequency signals to first IF frequency signals;
   down-converting said first IF frequency signals to second IF frequency signals;
   performing analog-to digital conversion of said second IF signals;
   tracking a location corresponding to each band of frequencies at which information is detected;
   providing said tracking location information to a signal synthesizer; and
   tuning to frequencies at which said information is detected.

10. A method of scanning as recited in claim 9 wherein said first IF frequency signals are between about 24 GHz and about 28 GHz.

11. A method as recited in claim 9 wherein said first IF frequency signals are about 30 to 35% higher in frequency than said RF frequency signals.

12. A method as recited in claim 9 wherein said filtering occurs in half octaves.

13. A receiver comprising:
    a first stage for up-converting received frequencies to first intermediate frequencies;
    a second stage for down-converting said first intermediate frequencies to second intermediate frequencies; and
    a third stage comprising a Bragg-cell processor for providing analog-to-digital conversion of information within signals at said second intermediate frequencies.

14. A receiver as recited in claim 13 wherein said first intermediate frequencies are in a range from about 30 to 35 percent higher than said received frequencies.

15. A receiver as recited in claim 13 wherein said Bragg-cell processor is capable of scanning frequencies over at least a 1 GHz band per frequency hop.

16. A receiver comprising:
    a Bragg-cell processor, and a synthesizer operable to generate local oscillation signals in connection with converting IF frequency signals for input to said Bragg-cell processor, said synthesizer being further operable to cause said receiver to capture RF information in approximately 1 GHz steps with about 1 GHz bandwidth per step of an output of the synthesizer.

17. A receiver comprising:
    a plurality of filters comprising a bank of filters for receiving an RF input signal;
    a synthesizer having a plurality of outputs, said synthesizer being operable to produce a first and second set of local oscillator (LO) signals, said first set of LO signals each being associated with a filter from said bank of filters;
    a frequency up-convert section operable to receive input from said plurality of filters and said synthesizer;
    a down-convert section operable to receive input from said frequency up-convert section and said second set of LO signals delivered in stepped output from said synthesizer,
    a Brag-cell processor operable to receive input from said down-convert section.

18. A receiver as recited in claim 17, further comprising a multiplexer operable to receive LO signals from said synthesizer and said filters so as to provide a stepped selection of filter inputs and signals from said first set of LO signals, said receiver being capable of scanning a range of receive frequencies as determined by a stepped selection of multiplexer filter inputs and LO signals from said first set and a stepped selection of signals from said second set.

19. A receiver as recited in claim 18 wherein said frequencies are radio frequencies (RF).

20. A receiver as recited in claim 18 wherein said scanning a range of receive frequencies is determined by a stepped selection number the product of multiplexer filter inputs and the number of steps of signal selection associated with said second set.

21. A receiver as recited in claim 20 wherein the bandwidth of said Bragg cell processor is determined by the bandwidth of input to the Bragg cell processor.

* * * * *